United States Patent [19]

Yamazaki

[11] Patent Number: 4,823,350
[45] Date of Patent: Apr. 18, 1989

[54] LASER DEVICE
[75] Inventor: Etsuo Yamazaki, Hachioji, Japan
[73] Assignee: Fanuc Ltd., Minamitsuru, Japan
[21] Appl. No.: 205,322
[22] PCT Filed: Oct. 6, 1987
[86] PCT No.: PCT/JP87/00752
  § 371 Date: May 31, 1988
  § 102(e) Date: May 31, 1988
[87] PCT Pub. No.: WO88/02939
  PCT Pub. Date: Apr. 21, 1988

[30] Foreign Application Priority Data
  Oct. 14, 1986 [JP] Japan .............. 61-243952
[51] Int. Cl.[4] .................................. H01S 3/00
[52] U.S. Cl. ........................ 372/38; 372/82; 372/69
[58] Field of Search ............ 372/38, 69, 82, 55, 372/81

[56] References Cited
U.S. PATENT DOCUMENTS 3,896,396  7/1975  Whitehouse et al. ........... 372/38
3,914,648  10/1975  Friedman et al. ............. 372/38
4,375,690  3/1983  Tabata et al. ................ 372/82
4,597,086  6/1986  Kimbara ...................... 372/61
4,627,063  12/1986  Hosokawa .................... 372/38
4,669,086  5/1987  Kaede et al. ................. 372/32
4,716,569  12/1987  Bees ......................... 372/69

Primary Examiner—Léon Scott, Jr.
Attorney, Agent, or Firm—Staas & Halsey

[57] ABSTRACT

A laser device has a plurality of electrodes mounted on an electric discharge tube and high-frequency power supplies connected respectively to the electrodes. The laser device comprises output detecting means (6, 7) for detecting output conditions of the high-frequency power supplies, respectively, fault detecting means (1b) for detecting the failure of a high-frequency power supply from the output conditions detected by the output detecting means (6, 7), and on/off switching means (1a) for turning off the failing high-frequency power supply in response to a failure signal from the fault detecting means (1b). When one of the high-frequency power supplies (21) fails, its output is cut off, and the operation of the laser device is continued by the remaining normal high-frequency power supplies.

10 Claims, 2 Drawing Sheets

LASER DEVICE

BACKGROUND OF THE INVENTION

1. Field of the Invention

The present invention relates to a laser device having a plurality of high-frequency power supplies, and more particularly to a laser device which, when one of the high-frequency power supplies fails, can separate the failing high-frequency power supply and be operated by the remaining normal high-frequency power supplies.

2. Description of the Related Art

Conventional laser devices have only one power supply for producing an electric discharge in the laser tube. When the power supply fails, therefore, the entire laser device is shut off.

The applicant has filed Japanese patent application No. 61-208492 on a laser device in which a laser tube has a plurality of electrodes associated respectively with high-frequency power supplies. FIG. 2 is a block diagram of the disclosed laser device. In a laser tube 10, a laser medium gas is circulated, an electric discharge is generated, and a laser beam is amplified. Designated at 12 is an output mirror, 13 is a total relection mirror, 14 is an air blower for circulating the laser medium gas, and 15 is a cooling unit for cooling the laser medium gas.

High-frequency power supplies (hereinafter referred to as RF power supplies) 21 through 28 are connected respectively to electrodes 31 through 38. Another electrode 39 is connected to ground. An output control circuit 41 enables the RF power supplies 21 through 28 according to output power required, which may be entered through a keyboard or the like. An output control line 42, shown as a single line, applies control signals to the respective RF power supplies to enable them respectively. Denoted at 51 is a laser beam.

Operation of the laser device shown in FIG. 2 will be described below. When the output power required may be half the full output power, signals are applied over the output control line by the output control circuit to enable the RF power supplies 23 through 26 while turning off the other RF power supplies. The current density in the central region in the laser tube is the same as that when the full output power is produced, and a TEM00 mode of operation is effected. However, the laser beam output is substantially proportional to the number of the enabled RF power supplies, and suitable for cutting off a workpiece, with a high oscillation efficiency obtained. By turning on some of the RF power supplies according to the output power needed, the desired output power can be produced without lowering the oscillation efficiency.

With a conventional laser device having a single high-frequency power supply, the laser device will be shut off if the power supply fails.

In a laser device with a plurality of high-frequency power supplies as shown in FIG. 2, when one of the high-frequency power supplies malfunctions causing its output voltage to be excessively increased or decreased, the laser device cannot be operated by the remaining high-frequency power supplies since these other normal high-frequency power supplies are connected to the laser tube parallel to each other.

SUMMARY OF THE INVENTION

It is an object of the present invention to provide a laser device which will solve the aforesaid problems and which, when one of several high-frequency power supplies fails, can separate the failing high-frequency power supply and be operated by the remaining normal high-frequency power supplies.

To solve the above problems, there is provided in accordance with the present invention a laser device having a plurality of electrodes mounted on an electric discharge tube and high-frequency power supplies connected respectively to the electrodes, the laser device comprising: output detecting means for detecting output conditions of said high-frequency power supplies, respectively; fault detecting means for detecting the failure of a high-frequency power supply from the output conditions detected by said output detecting means; and on/off switching means for turning off the failing high-frequency power supply in response to the failure signal from said fault detecting means.

When one of the high-frequency power supplies fails, the fault is detected by the fault detecting means, and the failing high-frequency power supply is turned off by the on/off switching means, while the laser device is continuously operated by the other normal high-frequency power supplies.

DESCRIPTION OF THE PREFERRED EMBODIMENT

An embodiment of the present invention will hereinafter be described in specific detail with reference to the drawings.

Figure 1:
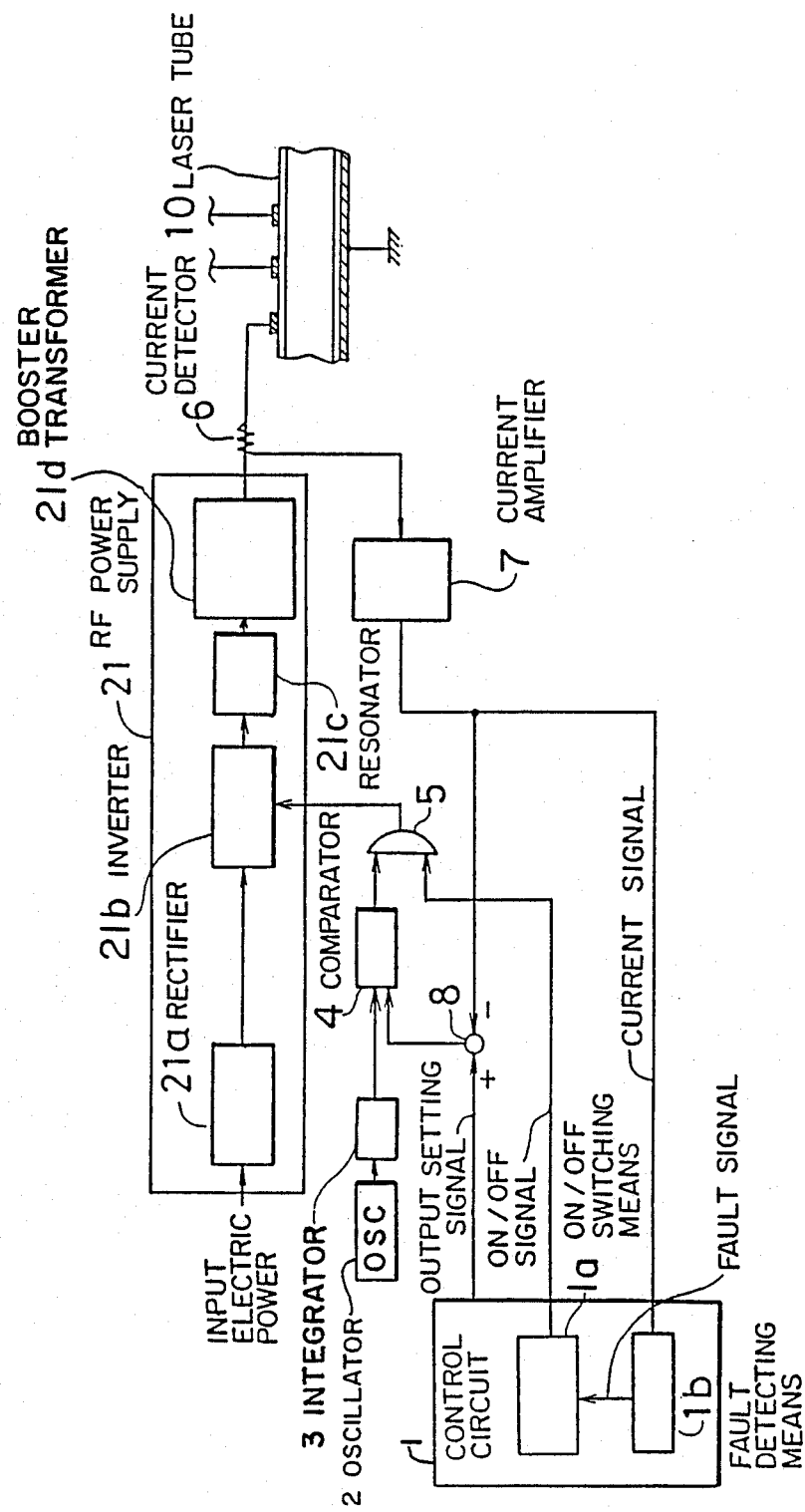
FIG. 1 is a block diagram of a laser device according to an embodiment of the present invention.
Figure 2:
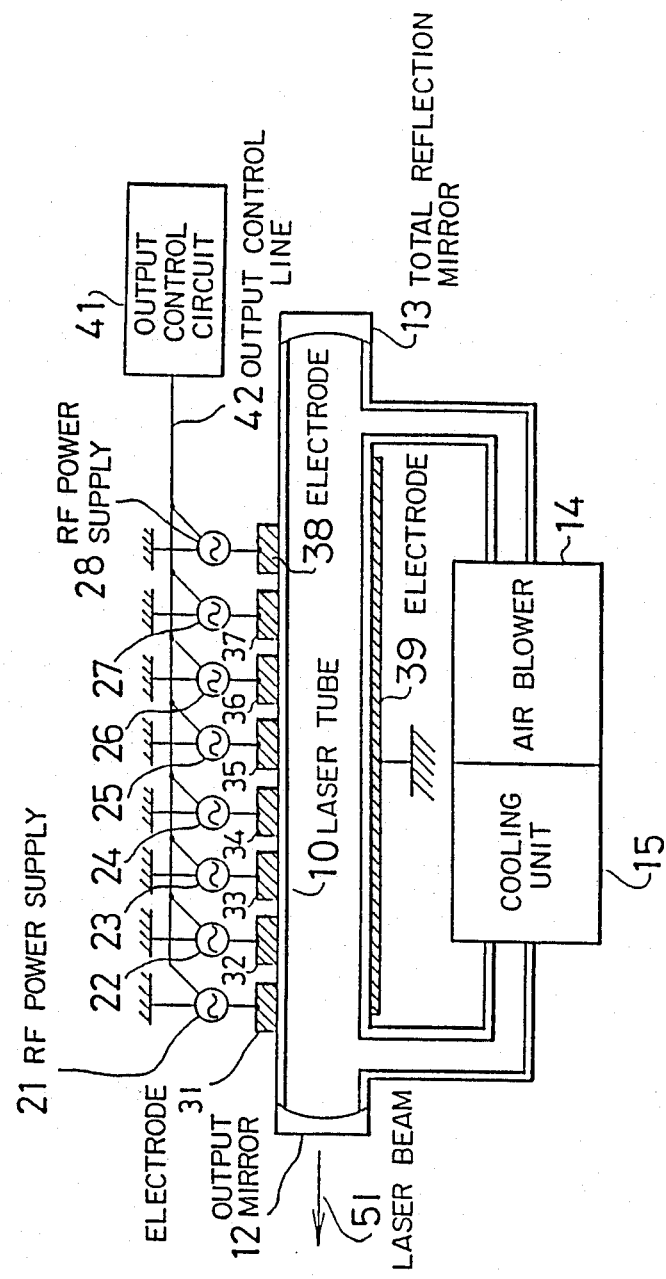
FIG. 2 is a view showing an overall laser device having a plurality of high-frequency power supplies.

FIG. 1 is a block diagram of an embodiment of the present invention, showing one high-frequency power supply. Those parts which are identical to those of FIG. 2 are denoted by identical reference numerals.

A control circuit 1 has on/off switching means 1a for turning on and off a high-frequency power supply, fault detecting means 1b for detecting the failure of the high-frequency power supply, and setting means (not shown) for setting a laser output. The control circuit 1 employs a numerical control system (CNC) for laser beam machining which simultaneously controls the table of a laser machine tool or the like. An oscillator 2 generates a rectangular waveform signal having the same frequency as that of a signal from an inverter 21b (described later). The output signal from the oscillator 2 is applied to and integrated by an integrator 3, and converted to a sawtooth waveform signal. The sawtooth waveform signal from the integrator 3 and a level signal from an arithmetic unit 8 are applied to a comparator 4, which determines a pulse duratin for the inverter 21b and issues a PWM signal (pulse width modulated signal). A gate 5 serves to gate the PWM signal from the comparator 4 with an on/off signal from the on/off switching means 1a. More specifically, when the on/off signal is "1", the PWM signal from the comparator 4 is directly applied to the inverter 21b. When the on/off signal is "0", the PWM signal is not passed through the gate 5.

A high-frequency power supply (RF power supply) 21 is constructed of a rectifier 21a, the inverter 21b, a resonator 21c, and a booster transformer 21d. Applied electric power is rectified and converted by the rectifier 21a to a DC voltage, which is converted by the inverter 21b to a rectangular waveform signal having a high frequency ranging from about 1 MHz to 2 MHz. The high-frequency rectangular waveform signal is then resonated by the resonator 21c, the output voltage of which is increased to a high voltage by the booster transformer 21d.

This high voltage is then applied to the laser tube 10. The output current from the high-frequency power supply 21 is detected by a current detector 6 which may be of a known current transformer, a Hall-effect device, or the like. The detected current is amplified by a current amplifier 7 and fed to the arithmetic unit 8 and the fault detecting means 1b. The arithmetic unit 8 determines the difference between the laser output setting signal and the detected current thus fed back, and applies a signal indicative of the difference to the comparator 4.

The fault detecting means 1b detects a failure of the high-frequency power supply 21 from the current signal. For example, a normal current level is preset, and if the current signal deviates from the normal current level by ±10%, then the fault detecting means 1b detects a failure. The normal current level may of course be varied based on calculations and measurements dependent on the failure condition of the actual device. When a failure is detected by the fault detecting means, a failure signal is applied to the on/off switching means 1a, which then issues an on/off signal of "0". The gate 5 produces an output signal of "0", thereby cutting off the output of the high-frequency power supply 21. The failing high-frequency power supply 21 is separated from the laser tube 10.

Since the control circuit for each of the high-frequency power supplies has the fault detecting means, any failing high-frequency power supply can be separated. Thus, the laser oscillation can be continued by the remaining high-frequency power supplies.

In the above embodiment, a current is employed to detect a fault, but an output voltage may also be used for fault detection, or both a current and a voltage may be utilized for detecting the failure of a power supply. It is possible to arrange the laser device to monitor the laser beam output at all times and check the conditions of the respective high-frequency power supplies for fault detection when the laser beam output suffers an abnormal condition.

While the output of the high-frequency power supply is cut off by applying an input signal of "0" to the inverter, the failing high-frequency power supply may be separated from the laser tube by a magnet switch or the like disposed at the final stage of the high-frequency power supply.

With the present invention, as described above, a plurality of high-frequency power supplies are employed, and a failing one of the high-frequency power supplies is separated by the fault detecting means. Therefore, when one of the high-frequency power supplies fails, the operation of the laser device can be continued by the other high-frequency power supplies.

I claim:

1. A gas laser device having a plurality of electrodes mounted on an electric discharge tube and high-frequency power supplies connected respectively to the electrodes, the laser device comprising:
    output detecting means for detecting output conditions of the high-frequency power supplies, respectively;
    fault detecting means for detecting a failing high-frequency power supply from the output conditions detected by said output detecting means and for outputting a failure signal upon detection of the failing high-frequency power supply; and
    on/off switching means for turning off the failing high-frequency power supply in response to the failure signal from said fault detecting means.

2. A gas laser device according to claim 1, wherein said fault detecting means and said on/off switching means are included in a numerical control system.

3. A gas laser device according to claim 1, wherein the output conditions detected are output currents.

4. A gas laser device according to claim 1, wherein the output conditions detected are output voltages.

5. A gas laser device according to claim 1, wherein the high-frequency power supplies include respective inverters for outputting a rectangular waveform signal.

6. A gas laser device according to claim 5, wherein said on/off switching means comprises a gate for controlling output of a control signal to the respective inverters of the high-frequency power supplies in dependence upon the failure signal from said fault detecting means.

7. A gas lever device having plurality of high-frequency power supplies, comprising:
    output detecting means for detecting output conditions of at least one of the power supplies;
    fault detecting means for outputting a fault signal if any of the power supplies are failing after comparing the output of each power supply, as detected by said output detecting means, with an expected output of normal power supply; and
    separating means for separating a failing power supply from the laser device in dependence upon the fault signal, the laser device being operated by the high-frequency power supplies remaining.

8. A method for controlling a gas laser device having a plurality of high-frequency power supplies, each having an output, said method comprising the steps of:
    (a) monitoring the output of each power supply;
    (b) comparing the output of each power supply with an expected output of a normal power supply;
    (c) determining failure of any of the power supplies in dependence upon the comparing in step (b);
    (d) separating power supplies from the laser device in dependence upon the determining in step (c), the laser device being operated by the power supplies remaining.

9. A method according to claim 8, wherein the output monitored in step (a) is current output by each power supply.

10. A method according to claim 8, wherein the output monitored in step (a) is voltage output by each power supply.

* * * * *

UNITED STATES PATENT AND TRADEMARK OFFICE
CERTIFICATE OF CORRECTION

PATENT NO. : 4,823,350
DATED : April 18, 1989
INVENTOR(S) : Etsuo Yamazaki

It is certified that error appears in the above-identified patent and that said Letters Patent is hereby corrected as shown below:

Col. 2, line 56, change "duratin" to --duration--;

Col. 4, line 32, change "lever" to --laser--, and after "having" insert --a--;

Col. 4, line 40, after "of" insert --a--.

Signed and Sealed this

Nineteenth Day of December, 1989

Attest:

JEFFREY M. SAMUELS

Attesting Officer                Acting Commissioner of Patents and Trademarks